US007049937B1

(12) United States Patent
Zweig et al.

(10) Patent No.: US 7,049,937 B1
(45) Date of Patent: May 23, 2006

(54) SELF-IDENTIFYING CABLE FOR INTERCONNECTING ELECTRONIC DEVICES

(75) Inventors: Jonathan M. Zweig, Cupertino, CA (US); Joseph M. Allem, San Jose, CA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 10/167,277

(22) Filed: Jun. 11, 2002

(51) Int. Cl.
*G05B 11/01* (2006.01)

(52) U.S. Cl. ........................... 340/310.11; 340/815.45; 324/66

(58) Field of Classification Search ........... 340/310.01, 340/815.45, 815.47, 815.4, 310.11; 324/66, 324/67
See application file for complete search history.

(56) References Cited

U.S. PATENT DOCUMENTS

| | | | | |
|---|---|---|---|---|
| 5,081,627 A * | 1/1992 | Yu | .............................. | 714/46 |
| 5,493,206 A * | 2/1996 | Boons | ......................... | 324/66 |
| 6,577,243 B1 * | 6/2003 | Dannenmann et al. | . . | 340/815.45 |

* cited by examiner

*Primary Examiner*—John Tweel, Jr.
(74) *Attorney, Agent, or Firm*—McGuinness & Manaras LLP

(57) ABSTRACT

Apparatus for use with a cable for interconnecting electronic devices is described. The apparatus includes an indicator for identifying a characteristic of the cable, and includes a mechanism operable to cause the indicator to identify the characteristic of the cable. The indicator can be for example an LED and can be used to identify the location of an end of the cable. The mechanism can be a pushbutton located at the other end of the cable. The LED is illuminated when the pushbutton is activated. A signal generator is responsive to the pushbutton and provides a signal to the LED to cause the LED to illuminate. The signal generator can be implemented with a DMTF encoder.

20 Claims, 13 Drawing Sheets

SELF-IDENTIFYING CABLE FOR INTERCONNECTING ELECTRONIC DEVICES

FIELD OF THE INVENTION

The present invention relates generally to cables for interconnecting electronic devices, and more particularly to mechanisms for identifying characteristics of such cables.

BACKGROUND OF THE INVENTION

Many of today's corporations have large data network infrastructures. A typical office building data closet has a patch-panel containing many connectors for network cables that run to the offices and cubicles elsewhere in the building. Network equipment often sits in a nearby rack. Network cables connect each of the office ports to one of the ports on the network equipment through the patch-panel. As users move, or network equipment is upgraded or replaced, the cables tend to become entangled. It becomes very difficult to identify the locations of cable ends. For instance, when a cable is plugged into a port on the network equipment, it is difficult to determine where on the patch panel the other end of the cable resides. In order to determine which network port is connected to a particular office cable-drop (or vice versa), most technicians today use one of two techniques. The first is to unplug the cable from the patch panel, and see whether any of the link-status lights on the network equipment goes out. If one does, the technician knows which port he has just disconnected. If not, it means the equipment in the user's office is not connected or not powered up. When successful, this first technique disadvantageously causes the momentary disruption of network connectivity. When unsuccessful, the technician must then use the second technique, which involves tugging the cable, running one's hands along it, and so forth to attempt to trace the cable manually. The problem is exacerbated when many cables run through a constricted opening, or are tightly bound together with a cable-strap. It would be desirable to provide a network cabling system which overcomes the above-described inadequacies and shortcomings.

SUMMARY OF THE INVENTION

In accordance with the principles of the invention, there is provided apparatus for use with a cable for interconnecting electronic devices. The apparatus includes an indicator associated with a cable for identifying a characteristic of the cable, and includes a mechanism operable to cause the indicator to identify the characteristic of the cable. The characteristic identified can be the location of one end of the cable. According to an aspect of the invention, the indicator is an LED located on one end of the cable. The mechanism is a pushbutton located at the other end of the cable. The LED is illuminated when the pushbutton is activated. A signal generator is responsive to the pushbutton and provides a signal to the LED to cause the LED to illuminate. The signal generator may conveniently be implemented as a DTMF encoder.

The apparatus may further include a power detector circuit responsive to the pushbutton for detecting whether power is available on the cable. The power detector circuit causes power to be provided to the cable if power is not already available on the cable. An embodiment of the cable is for interconnecting Ethernet devices which are IEEE 802.3af compatible.

According to an alternate aspect of the invention, the mechanism operable to cause the indicator to identify the characteristic of the cable may be a magnetically coupled device. According to another aspect of the invention, the indicator may be a sound generator.

Also according to the principles of the invention, a cable system is provided for interconnecting electronic devices. A first cable is provided for connecting to a first electronic device. The first cable includes an indicator, such as an LED, for identifying a characteristic of the first cable that plugs into the electronic device. A second cable is provided for connecting to a second electronic device. The second cable includes a mechanism, such as a pushbutton, operable to cause the indicator to identify the characteristic of the first cable. The characteristic may be the location of the end of the first cable that is connected to the first electronic device, and the indicator may be an LED located on the end of the first cable.

Further in accordance with the principles of the invention, apparatus for interconnecting electronic devices includes a first electronic device, a second electronic device, and a cable for transferring power and information between the first electronic device and the second electronic device. An indicator for identifying a characteristic associated with one end of the cable is provided. A mechanism is operable to cause the indicator to indicate the characteristic associated with the one end of the cable by causing a signal to be transferred to the indicator via the cable. The indicator may be located on the first electronic device while the mechanism comprises a pushbutton located on the second electronic device. Alternately, the mechanism may be a circuit located in the second electronic device, the circuit being responsive to user commands to cause a signal generator to produce the signal.

All of the variations of the invention herein described are advantageous to locate cable ends without disrupting network connectivity or causing undue manual searching.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
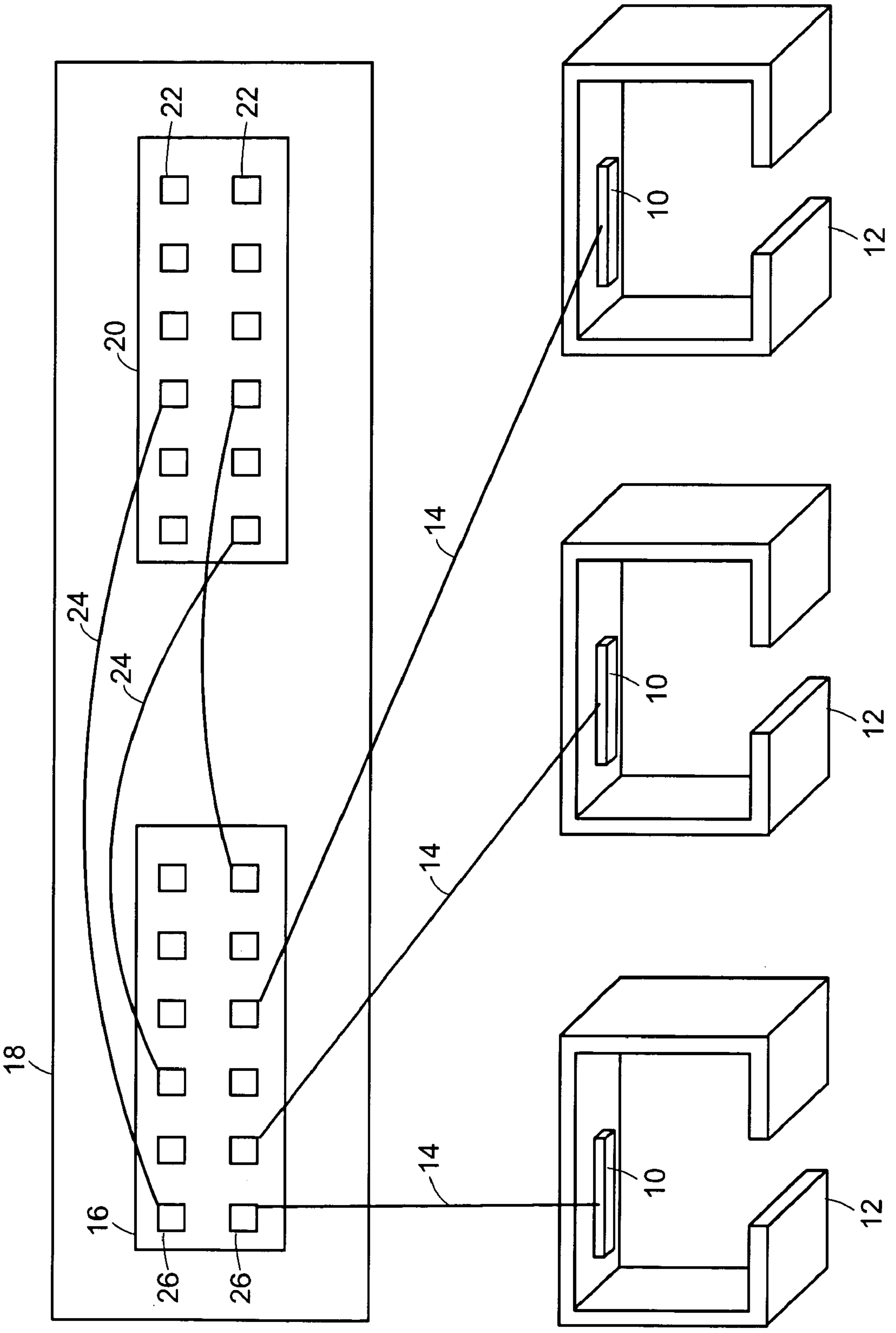
FIG. 1 is a schematic view of an office environment in which various network devices are interconnected to network equipment via cables.

In FIG. 1 there is shown a typical office environment wherein network devices 10 in offices or cubicles 12 are connected by cables 14 to a patch panel 16 located in a wiring closet 18. The wiring closet 18 also includes racks of network equipment 20. The ports 22 on the network equipment 20 are connected via cables 24 to ports 26 on the patch panel 16, thereby establishing network connectivity between the network equipment 20 and the network devices 10. The network devices 10 may be for example computer network adapters, IP telephones, and the like. The network equipment 20 may be for example routers, Ethernet switches, and the like. A given wiring closet 18 may contain patch panels 16 and network equipment 20 having hundreds of ports, thus requiring hundreds of cables 24.

The network equipment 20 and network devices 10 are preferably Ethernet devices that conform to the IEEE 802.3af standard, currently described in IEEE Draft 802.3af/D3.0, herein incorporated by reference, which specifies a technique for providing power to the Ethernet cable in order to power Ethernet 802.3af compliant devices. This standard uses a detection signature to determine whether a network device 10 that requires power is plugged into the network. If so, the network equipment 20 provides 48 V power to the network device 10 over the cables 24 and 14. In accordance with the standard, a network device 10 that is capable of receiving power from network equipment 20 via the signal lines provided through the cable 24 presents the detection signature to the network equipment 20 so that the network equipment 20 can determine that the network device 10 is capable of receiving power over the cable 24. In particular, the network device 10 that is capable of receiving power over the cable 24 provides a signature characterized by a DC resistance of between 25,000 Ohms +/−5%, and a capacitance of less than 0.1 uF capacitance. The network equipment 20 contains a detection circuit that produces a detection voltage between 2.8 and 10 volts when connected to a network device 10 that presents the proper detection signature. The detection measurements reject resistances below 15,000 Ohms and above 33,000 Ohms. If slope comparisons detect a resistance of about 25,000 ohms, power will be provided to the network device 10 via either signal pairs 1,2 and 3,6, or signal pairs 4,5 and 7,8 on the standard RJ45 twisted pair Ethernet cable.

Figure 2:
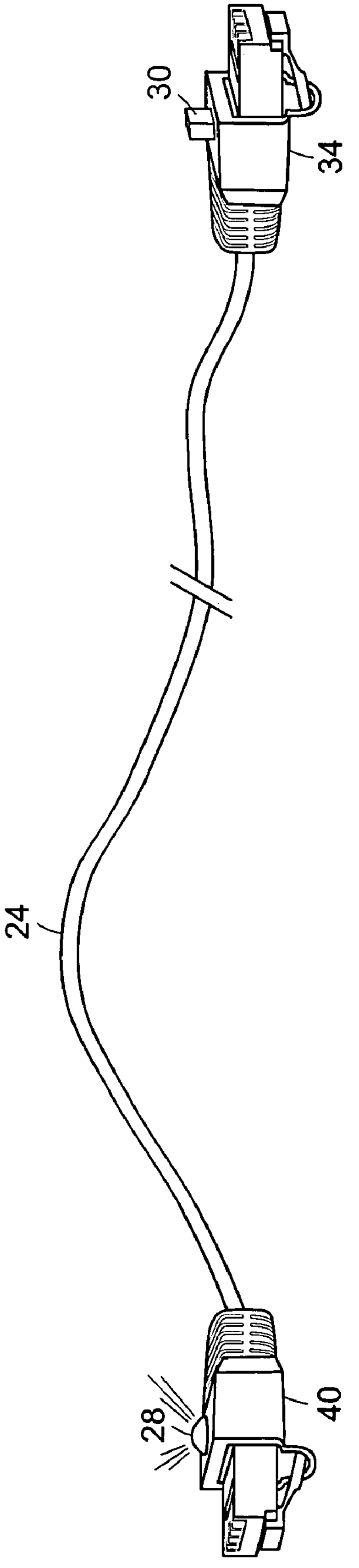
FIG. 2 is a perspective view of a cable according to the principles of the invention.

In FIG. 2 there is shown an embodiment of a cable 24 in accordance with the principles of the invention. The cable 24 includes an indicator 28 at one end for connection to a port 22 on the network equipment 20. The indicator is herein shown to be an LED. The cable 24 includes a mechanism 30 at the other end of the cable located at the patch panel, which when activated, causes the LED to illuminate. The mechanism 30 is herein shown to be a pushbutton. A person can thereby push the pushbutton 30 at the patch panel end of the cable 24 to determine the location of the other end of the cable 24, or determine the port 22 on the network equipment 20 into which the other end of the cable 24 is connected.

Figure 3:
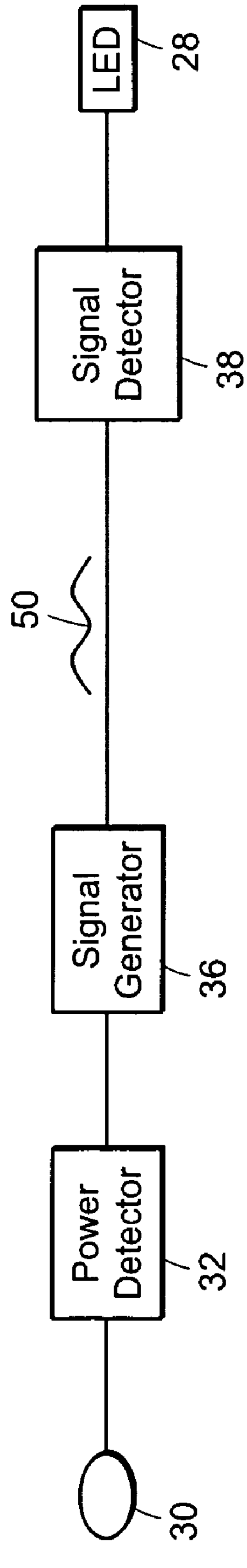
FIG. 3 is a schematic view of the components of the cable of FIG. 2.

Referring to FIGS. 2 and 3, the pushbutton 30 activates a power detector circuit 32 within the end 34 of the cable 24. The power detector circuit 32 is coupled to a pair of signal lines carrying power within the cable, as specified by the 802.3af standard. The power detector circuit 32 is coupled to a signal generator 36 within the end 34 of the cable 24. The signal generator 36 is coupled through the signal lines carrying power within the cable 24 to a signal detector 38 located in the end 40 of the cable 24, which is in turn coupled to the LED 28.

Figure 4:
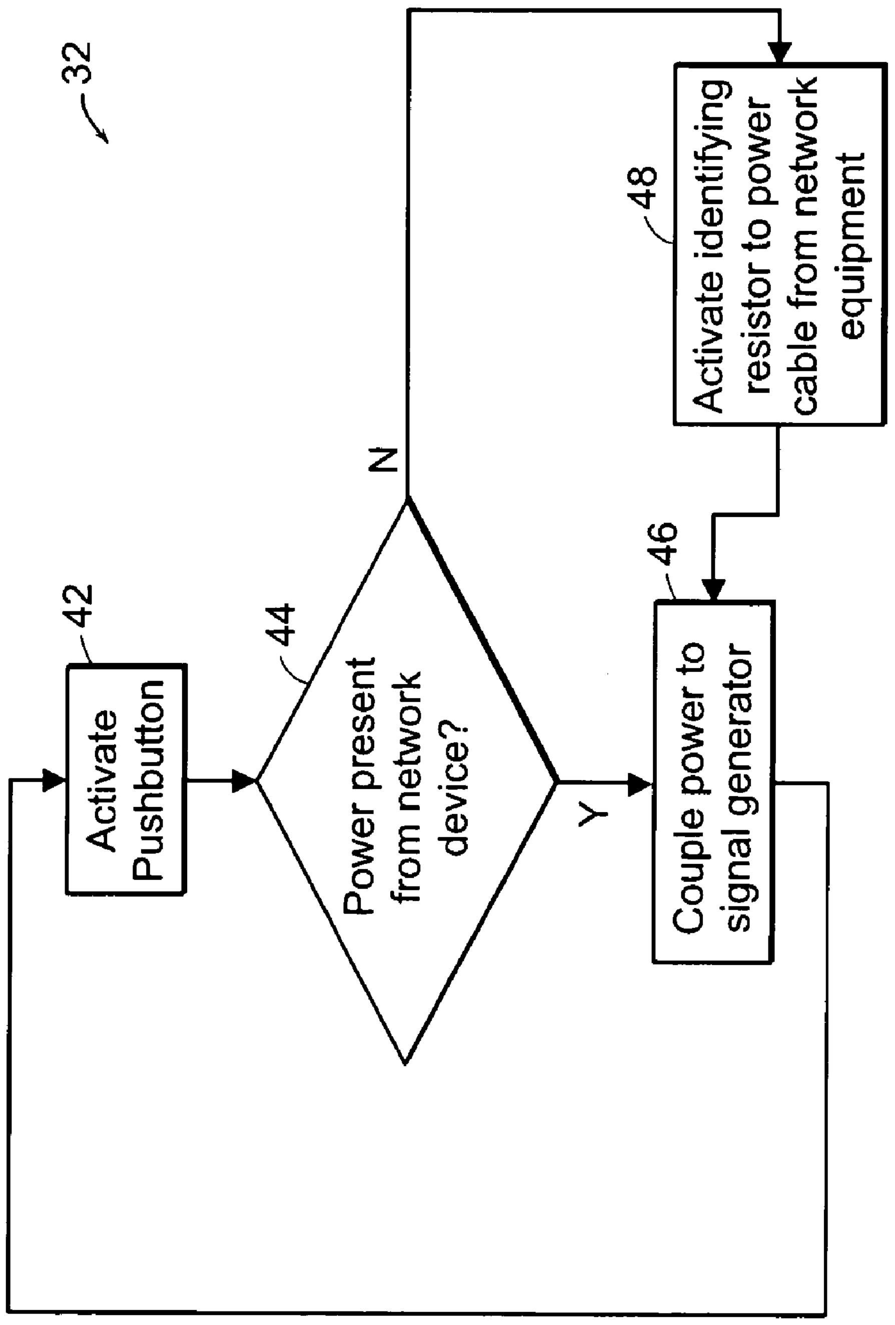
FIG. 4 is a flow diagram of the operation of the power detection circuit of FIG. 3.

According to one embodiment of the power detector circuit 32 as shown in FIG. 4, when the pushbutton is activated (step 42), the circuit 32 determines whether there is power on the cable (step 44). If the cable is plugged into an 802.3af compliant network device 10, power will be present and can be applied to the signal generator 36 (step 46). If no power is present, then either the network device 10 is not 802.3af compliant, or the network device 10 is turned off, or the cable 24 is not plugged in. The power detector circuit 32 is 802.3af compliant and can apply a 25,000 Ohm powered-device detection resistor as described above, thus causing power to be applied from the network equipment 20 to the cable 24 if no power is otherwise present (step 48).

Activation of the pushbutton 30 causes power to be applied to the signal generator 36. The signal generator 36 places a signal 50, such as a low-frequency, low-amplitude alternating current potential, across one of the pairs of wires within the cable 24, in accordance with any of a number of known techniques. This signal is received by the signal detector 38 coupled to the LED 28 at the other end 40 of the cable 24, and causes the LED to illuminate in response to reception of the signal 50 in accordance with known techniques.

The signal generator 36 may generate the signal 50 only while the pushbutton 30 is activated, causing the LED 28 to illuminate only while the pushbutton 30 is activated. Alternately, the signal generator 36 may contain a delay element that causes power to be applied to the LED 28 for a certain minimum amount of time such that the LED 28 stays lit for a certain period of time after the pushbutton 30 is activated. According to another embodiment, the pushbutton 30 may activate a double throw switch such that power will be applied to the LED 28 upon a first activation of the pushbutton 30, and will remain applied until a second activation of the pushbutton 30. Such functionality is advantageous where the patch panel 16 and network equipment 20 are not within visual range of each other. A person can push the pushbutton 30, leave to find the other end of the cable having the illuminated LED 28, and return to disable the LED 28 by pushing the pushbutton 30 again.

According to a preferred embodiment of the invention, the signal generator 36 is a dual tone multi-frequency (DTMF) tone generator, of the sort known for generating touch tone signals in telephones. When the pushbutton 30 is activated, the DTMF tone generator 36 generates a tone, consisting of a pair of low frequency pulsed signals, on one of the cable wire pairs. The signal is coupled to the signal detector 38, which causes the LED 28 to illuminate. The signal detector 38 may be a DTMF decoder, or may be a simpler circuit responsive to the tone. Employment of the DTMF tone generator 36 is advantageous in that different tones can be employed for different cables 24, thus minimizing interference between close cables in the event that several close cables need to be activated at the same time. Employment of the DTMF tone generator 36 also allows a series of different tones to be supplied to the signal detector 38, which can be used to cause the LED 28 to blink in selected patterns. Multiple LEDs of different colors could be employed, each color responsive to a particular DTMF tone.

Figure 5:
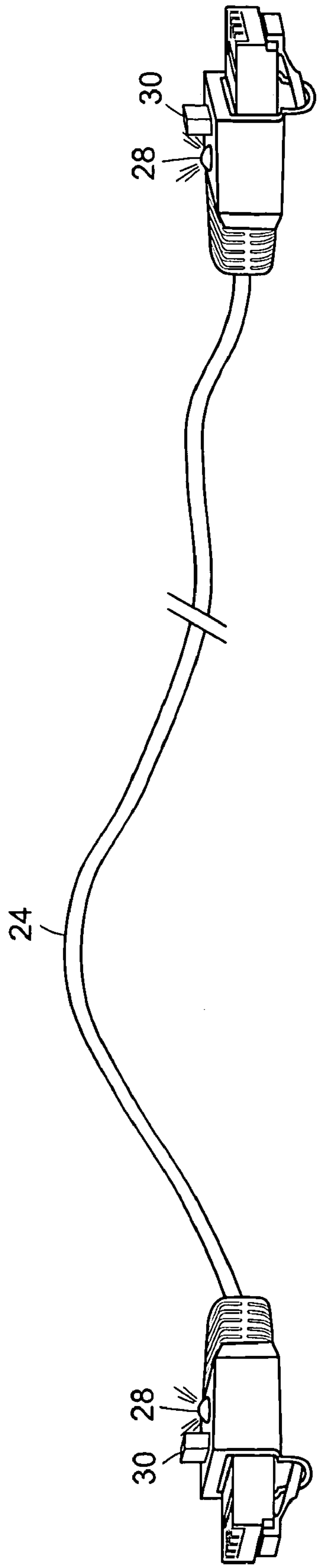
FIG. 5 is a perspective view of a cable according to another embodiment of the invention.
Figure 6:
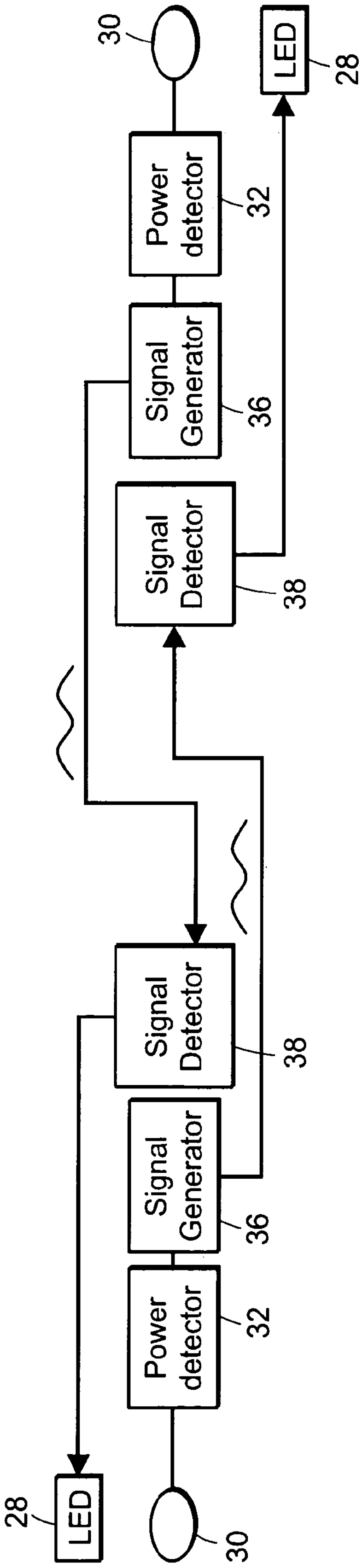
FIG. 6 is a schematic view of the components of the cable of FIG. 5.

Referring to FIG. 5, an alternate embodiment of the invention is shown, wherein the cable 24 includes a pushbutton 30 and an LED 28 at each end. In this embodiment, each end of the cable 24 includes the power detector circuit 32, the signal generator 36, and the signal detector 38 as shown in FIG. 6. This cable is advantageous in that the cable may be traced from either end, i.e. from the patch panel 16 to the network equipment 20 or vice versa.

Figure 7:
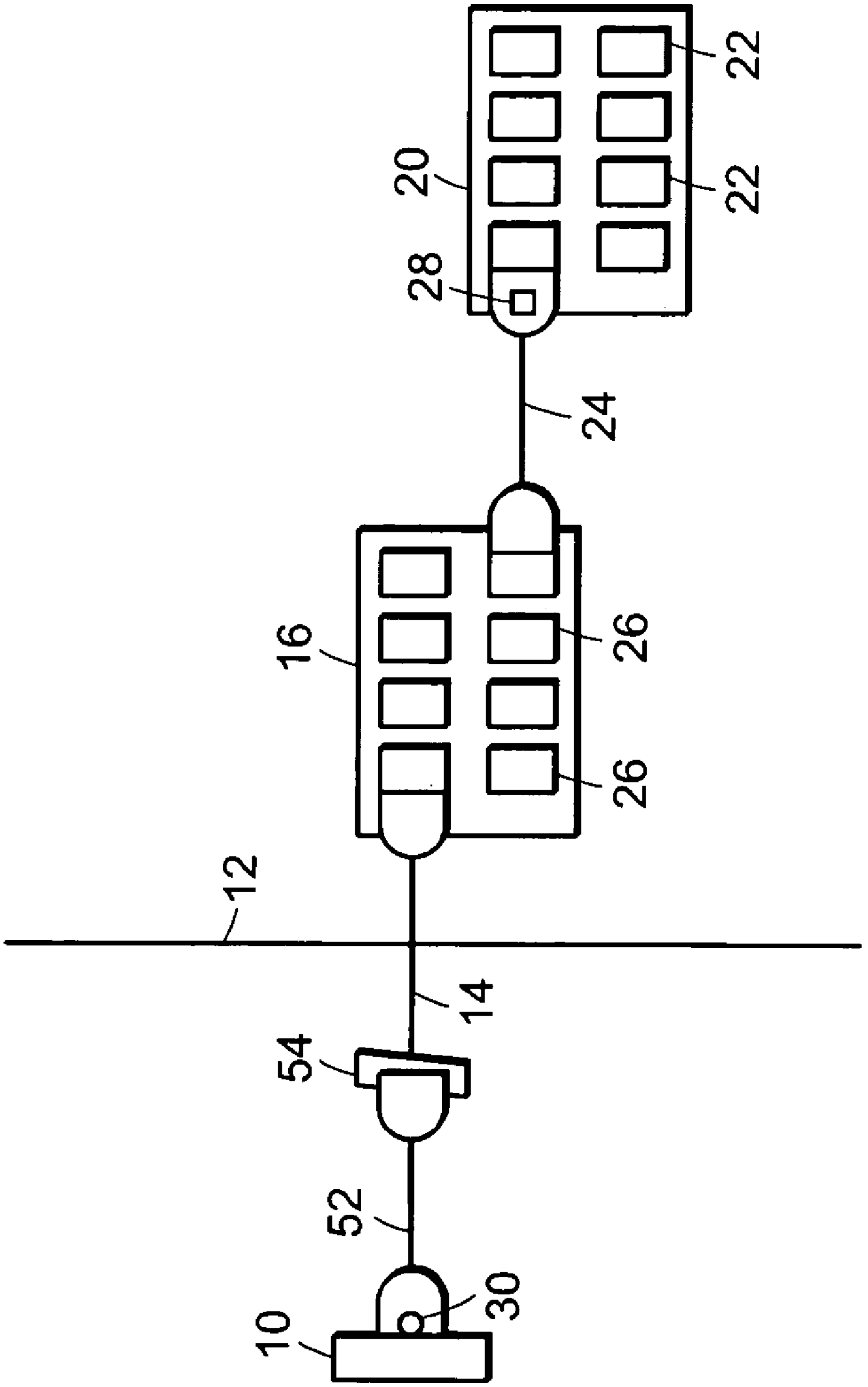
FIG. 7 is a schematic view of a cable system for interconnecting a network device and network equipment.

In FIG. 7 there is shown an embodiment of the invention employing multiple cables. A cable 52 located in an office or cubicle 12 includes a pushbutton 30. The cable 52 connects a network device 10 to a wall receptacle 54 on a wall of the office 12. Another cable 14 connects the wall receptacle 54 to a port 26 on the patch panel 16. A cable 24 is connected between a port 26 on the patch panel 16 and a port 22 on the network equipment 20. In this example, a person would like to locate the port 22 on the network equipment 20 to which the network equipment 10 is attached. The cable 52 includes the pushbutton 30, power detector circuit 32, and signal generator 36 as shown in FIG. 3. The pushbutton 30 on the cable 52, when activated, causes the signal generator 36 to generate a signal that travels through the cables 52 and 14 to the patch panel 16 and onto the cable 24. The cable 24 includes the signal detector 38 and LED 28 at the end of the cable 24 that is plugged into the network equipment 20. The signal detector 38 receives the signal from the signal generator 36, and thus causes the LED 28 at the end of the cable 24 to illuminate in response to the activation of the pushbutton 30 on the cable 52. The network port 22 associated with the network device 10 located in the office or cubicle 12 can thereby be identified directly from the office or cubicle 12.

It is also certainly possible to reverse the cable 52 such that the pushbutton is located at the wall receptacle 54. It is also possible to implement the cable of FIG. 2 or 5 for each of cables 14 and 24 so that the entire network segment can be traced.

Figure 8:
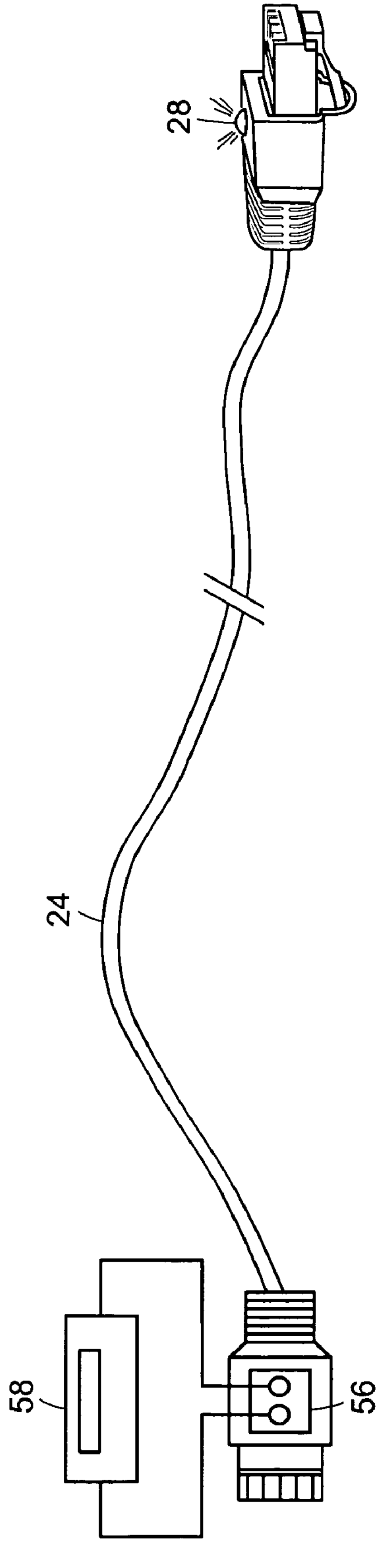
FIG. 8 is a perspective view of a cable according to another embodiment of the invention.

In an environment where 802.3af compatible equipment is not available, a cable such as cable 24 could have a connector 56 mounted at one end of the cable that allows an external power source to cause the LED 28 at the other end of the cable to become illuminated. For example, as shown in FIG. 8, the LED 28 may be coupled to a cable wire pair at one end of the cable 24, and a simple battery 58 may be clipped to the connector 56 at the other end of the cable 24 to cause the LED 28 to illuminate.

Figure 9:
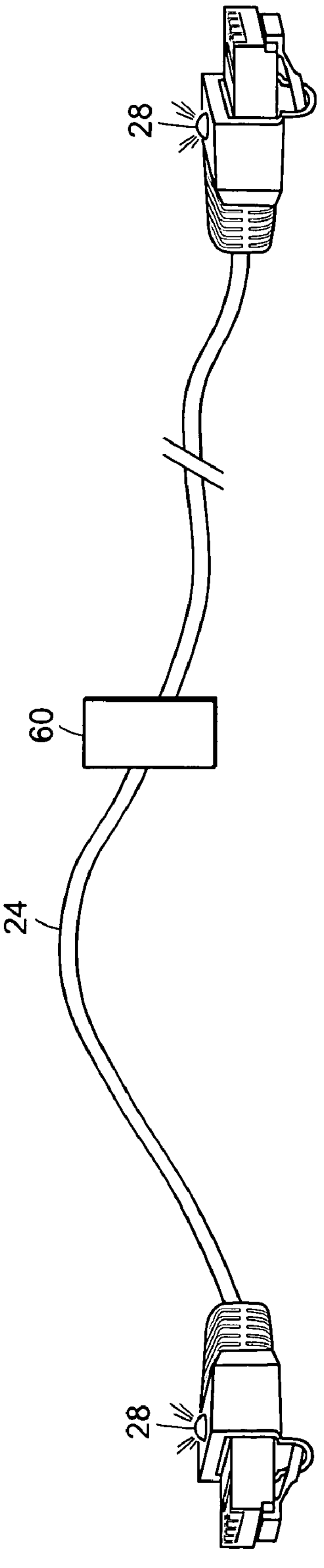
FIG. 9 is a perspective view of a cable according to another embodiment of the invention.

The mechanism 30 for causing the indicator, herein the LED 28, to light may alternately be an external signal that is magnetically coupled directly into the cable 24, allowing identification of one or both ends of the cable 24 by applying a device to the middle of the cable. For example, as shown in FIG. 9, a cable 24 contains an LED 28 at each end. Each end of the cable 24 contains a signal detector 38 as shown in FIG. 3. A magnetically coupled device 60 is attached to the middle of the cable 24. The magnetically coupled device generates an alternating current signal 50 that couples to the cable wire pairs to which the circuit 38 is coupled, thereby causing the circuit 38 to illuminate the LEDs 28 at each end of the cable.

The indicator 28 can be implemented as a sound generator rather than an LED. This could be useful in very large environments where finding a blinking LED might be too time-consuming.

Figure 10:
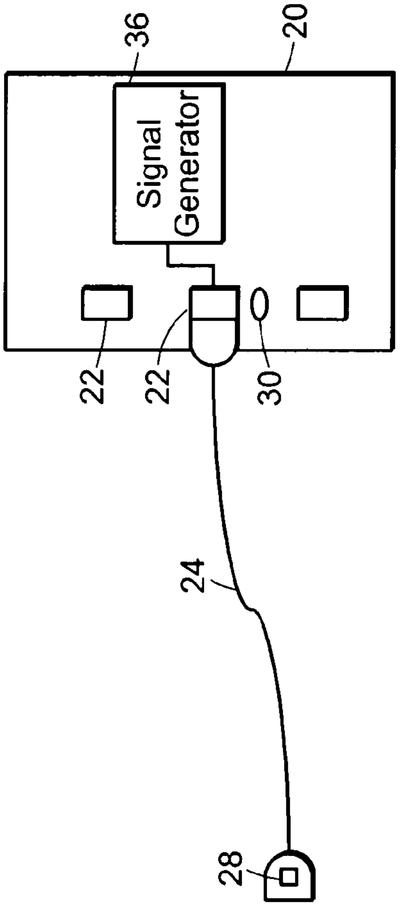
FIG. 10 is a schematic view of a cable system where the signal generator is resident within the network equipment.
Figure 11:
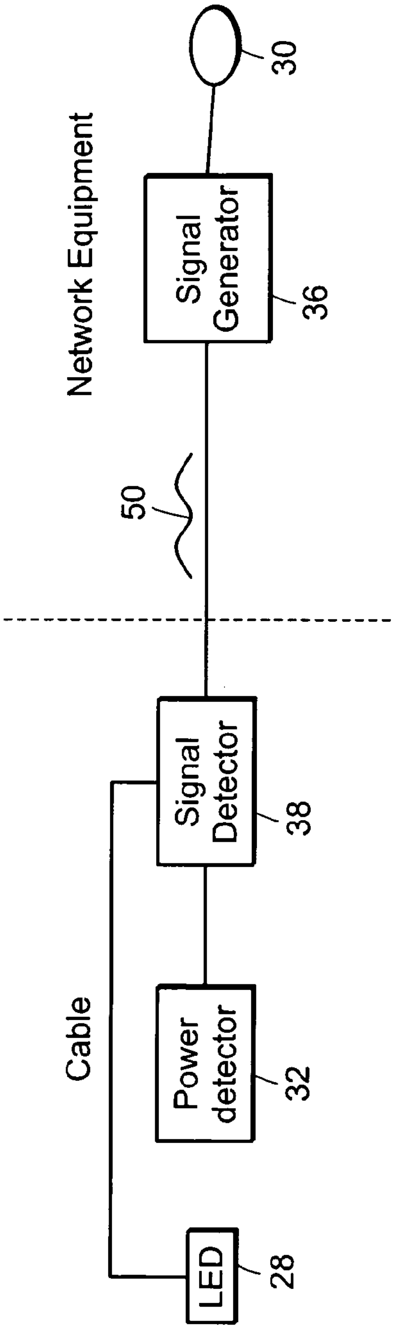
FIG. 11 is a schematic view showing the arrangement of the components of the cable system of FIG. 10.

The activating signal 50 can also be generated by the network equipment 20 that is supplying the 802.3af compliant power. As shown in FIG. 10, a cable 24 is plugged into a port 22 on network equipment 20. The signal generator 36 is located within the network equipment 20 and is coupled to the cable 24 through the port 22. A pushbutton 30 located near the port 22 can be activated in order to cause the LED 28 at the other end of the cable 24 to illuminate. As shown in FIG. 11, the cable 24 includes a signal detector 38 for receiving the signal generated by the signal generator 36. Also included in the cable is the power detector circuit 32 previously described, for determining whether power is available on the cable and for employing the power detection resistor in the cable if needed. The power detector circuit 32 causes power to be applied to the signal detector 38. The power detector circuit 32 operates as shown in FIG. 4 except that step 42 is not required. The power detector circuit 32 is not responsive to the pushbutton; rather, it ensures that power is always provided over the cable by the network equipment 20. For example, to implement step 48, the power detector circuit 32 can consist of a transistor circuit and a 25 K Ohm resistor. When the cable is plugged into an 802.3af compliant device, the transistor circuit ensures that the 25 K Ohm resistor remains out of circuit. When power is not present, the transistor circuit causes the 25 K Ohm resistor to be in circuit so that it can be sensed by the network equipment 20. Alternately, the power detector circuit 32 can consist of a charge pump circuit that accumulates energy from the ramp pulses that the network equipment sends to check for an 802.3af compliant device, and can apply the accumulated energy to power the signal detector 38 and illuminate the LED 28. Such a charge pump circuit is described in commonly owned co-pending patent application Ser. No. 09/696,279, filed Oct. 25, 2000. The signal generator 36 is powered by the network equipment 20 and provides power over the cable signal lines as defined in the 802.3af standard, along with the signals 50 for powering the LED 28.

The power detector circuit 32 can be enhanced such that it "wakes up" on a periodic basis, checks for power, and places the 25 K Ohm resistor in circuit if needed. The signal detector 38 then causes the LED 28 to illuminate if a signal is being sent at that time by the signal generator 36.

Figure 12A:
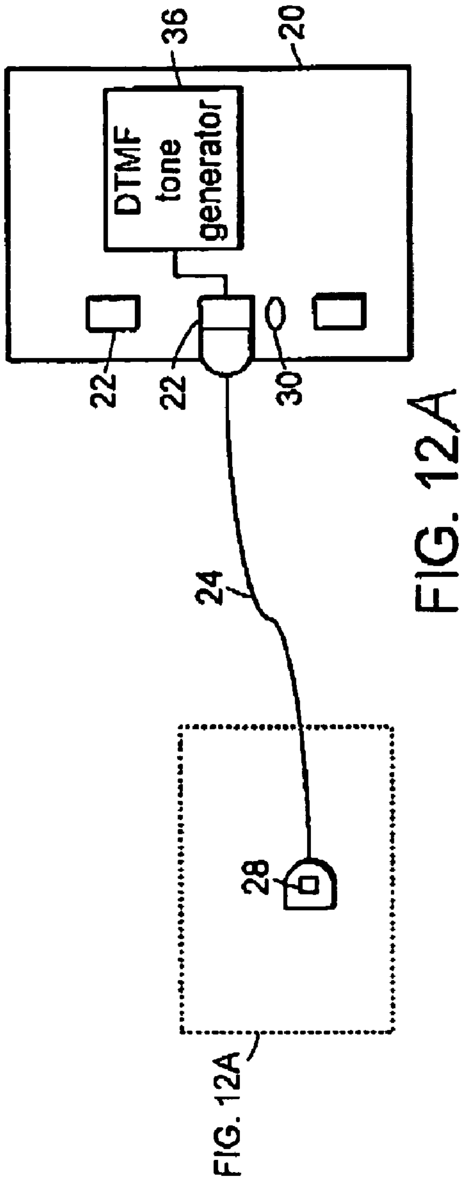
FIGS. 12A and 12B are schematic views of other embodiments of the cable system of FIG. 10.
Figure 12B:
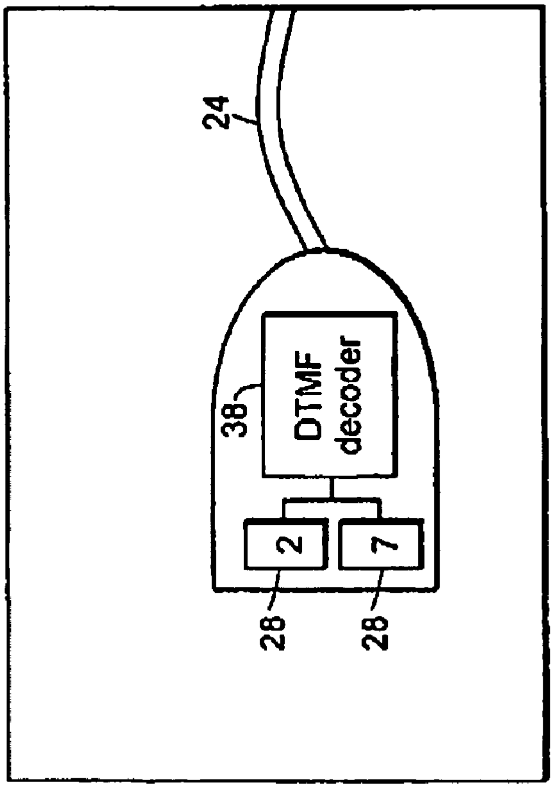

Further aspects of the invention are shown in FIGS. 12A where the signal generator 36 is located within the network equipment 20 and is implemented as a DTMF tone generator. In addition, in FIG. 12B the signal decoder 38 is implemented as a DTMF tone decoder in the cable 24. The indicator 28 is a multi-digit LED display capable of displaying individual characters. The DTMF tone generator 36 generates multiple tones dependent upon the network equipment 20 port 22 location into which the cable 24 is plugged. Thus, activation of a pushbutton 30 near a port 22 on the network equipment 20 causes for example two tones to be generated—herein shown as the DTMF tones for "2" and "7". The DTMF tone decoder 38 decodes these tones and causes the LED display to display "27", the port on the network equipment 18 into which the cable is plugged. A person at the patch panel can now look at the cable and know which port on the network equipment it is plugged into.

Figure 13:
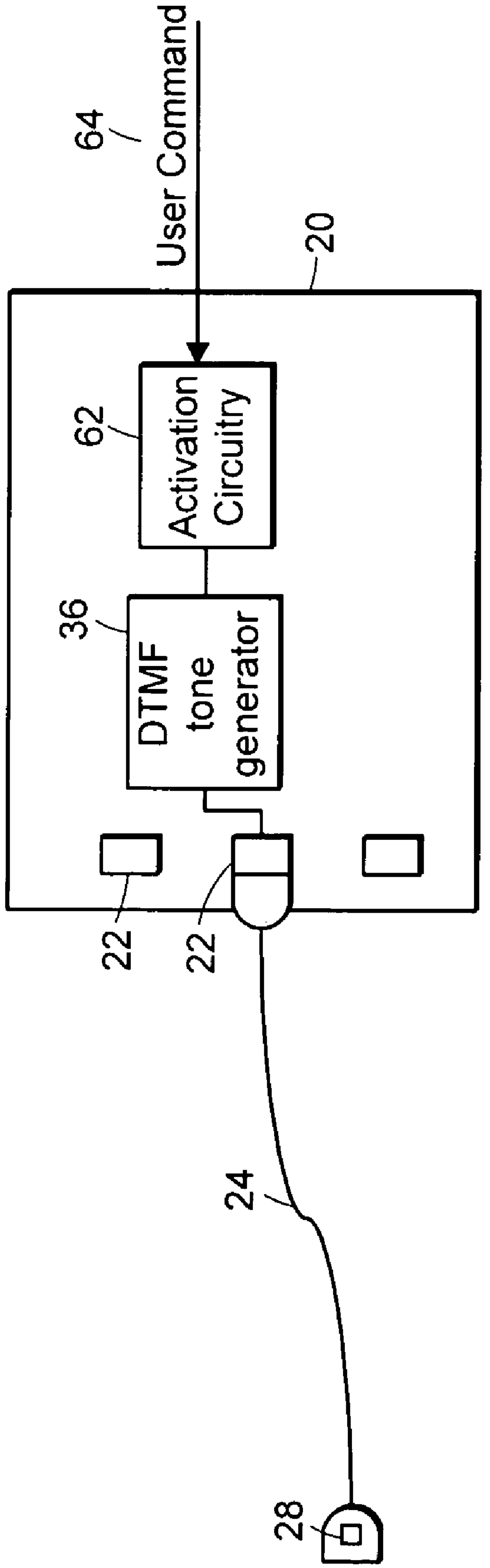
FIG. 13 is a schematic view of another embodiment of the cable system of FIG. 10.

Alternatively, as shown in FIG. 13, the signal generator 36 within the network equipment 20 may be activated via internal activation circuitry 62 rather than in response to the activation of a pushbutton 30. Various user commands 64 can be generated, for example via SNMP commands, to cause various indications. The activation circuitry 62 can be responsive to a user command 64 in order to cause the signal generator 36 to provide tones that indicate a characteristic of the port into which the cable is plugged. For example, the signal generator 36 may provide a first tone if the port 22 is a high speed port, or a second tone if the port 22 is a low speed port. The different tones can be decoded by the signal decoder 38 to cause the LED 28 at the end of the cable to blink at different rates. For example, if the cable 24 is plugged into a high speed port, the LED 28 may be steadily illuminated. Alternatively, if the cable 24 is plugged into a low speed port, the LED 28 may blink. If the LED 28 is implemented as a digital LED display, as was shown in FIG. 12, certain numbers and/or letters can be displayed that would indicate the characteristic of the port into which the cable is plugged. A user command 64 "show port number" can be sent to the activation circuitry 62 which then causes the signal generator 36 to generate a series of tones that is decoded by the signal decoder 38 to cause the LED display 28 to display the port number. Another user command 64 "show port speed" can be sent to the activation circuitry 62 which then causes the signal generator 36 to generate a series of tones that is decoded by the signal decoder 38 to cause the LED display 28 to display an indication of the port speed.

Figure 14:
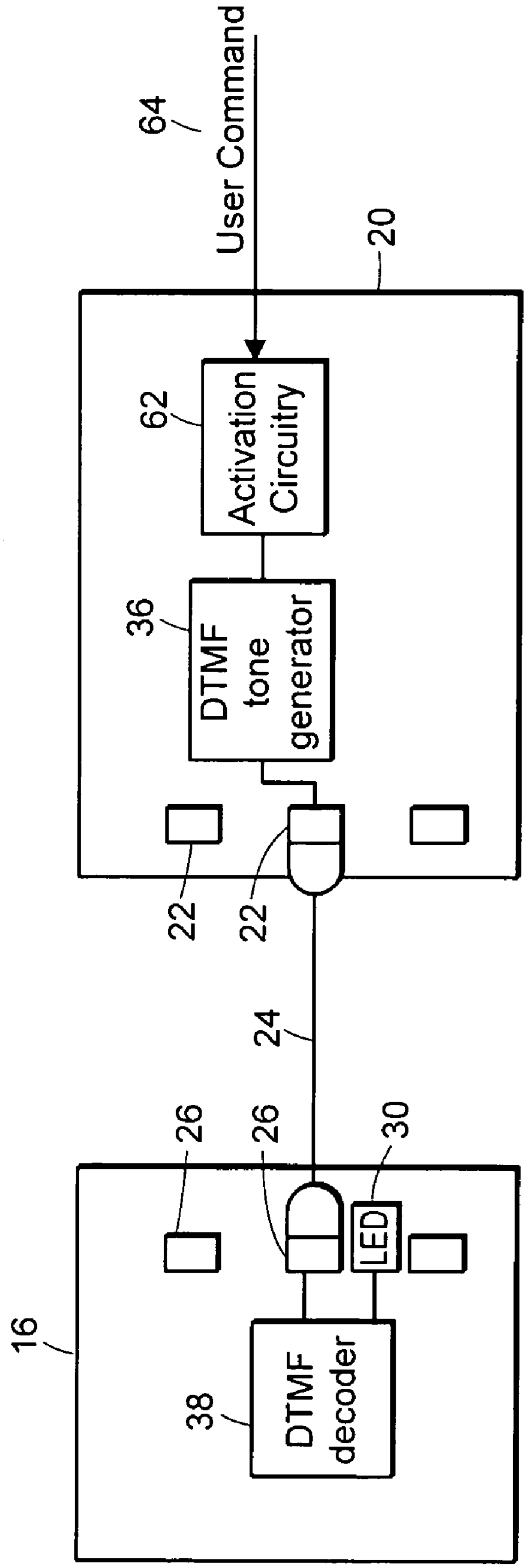
FIG. 14 is a schematic view of a cable system where the signal generator is resident within the network equipment and the signal decoder is resident within the patch panel.

In another embodiment, as shown in FIG. 14, the signal detector 38 may be located within the patch panel 16, and the LED may be located on the patch panel 16 near a port 26. The signal generator 36 located within the network equipment 20 generates a tone 50 that travels through the cable and is decoded by the signal decoder 38, causing the LED on the patch panel 16 to illuminate. Again the LED can be a simple LED or an LED display, and activation circuitry 62 with the network equipment 20 can cause the signal generator 36 to generate tones representative of port characteristics, which can then be displayed by the LED or LED display on the patch panel 16. In this embodiment, the patch panel 16 may be an 802.3af compatible device and may thus obtain power from the network equipment 20 to power the signal decoder for each port. Alternately, the cable may contain the previously described power detector circuit 32 and may then cause power to be provided from the network equipment 20 to the patch panel 16.

According to other embodiments, the activation circuitry is not only responsive to user commands, but can also operate independently. The activation circuitry 62 may cause the signal generator 36 to send a signal that causes the port number to always be displayed. Or, the activation circuitry 62 may cause the signal generator 36 to send tones at fixed intervals, for example every 10 seconds, such that the cable periodically displays the port number into which it is plugged, or a characteristic of the port into which it is plugged, for example high speed port vs. low speed port. The circuitry 62 can also cause the signal generators 36 associated with each port on the network equipment 20 to "sound off"—that is, the signal generators 36 periodically send tones onto the cables 24, causing each cable to periodically illuminate its LED or display its port number. Such functionality could also be provided on request via the user command. In all such embodiments, the indicator LED may be located either on the cable 24 itself or on the patch panel 16.

Furthermore, referring back to FIG. 7, it can be seen that any of the embodiments of FIGS. 10–14 may be employed in the multi-cable embodiment shown in FIG. 7. For example, the signal generator 36 located in the network equipment 20 can send tones through the multiple cables 24, 14, and 52 of FIG. 7 so that a person can view the LED or LED display 28 located on the cable 52 that is connected to a network device 10.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

We claim:

1. Apparatus comprising:

a cable for interconnecting electronic devices, the cable comprising:

an indicator manufactured as part of one end of the cable for identifying a characteristic of the cable; and a mechanism manufactured as part of the cable, powered by at least one of the electronic devices and operable to cause the indicator to identify the characteristic of the cable when engaged.

2. The apparatus of claim 1 wherein the characteristic is the location of one end of the cable.

3. The apparatus of claim 2 wherein the indicator is an LED located on the one end of the cable.

4. The apparatus of claim 3 wherein the mechanism is a pushbutton located on the other end of the cable, and wherein the LED is illuminated when the pushbutton is activated.

5. The apparatus of claim 4 wherein the cable further comprises a signal generator responsive to the pushbutton for providing a signal to the LED to cause the LED to illuminate.

6. The apparatus of claim 5 wherein the signal generator is a DTMF encoder.

7. The apparatus of claim 6 further comprising a signal detector coupled to the LED, wherein the signal detector is capable of receiving a tone from the DTMF encoder and causing the LED to illuminate in response to the reception of the tone.

8. The apparatus of claim 1 wherein the cable further comprises:

a power detector circuit responsive to the mechanism for detecting whether power is available on the cable, and for causing power to be provided if power is not available on the cable.

9. The apparatus of claim 8 wherein the cable is for interconnecting Ethernet devices.

10. The apparatus of claim 9 wherein the power detector circuit is 802.3af compliant.

11. The apparatus of claim 1 wherein the indicator is a sound generator.

12. A cable system for interconnecting electronic devices comprising:

a first cable for connecting to a first electronic device, the first cable comprising:

an indicator manufactured as part of the first cable for identifying a characteristic of the first cable; and a second cable for connecting to a second electronic device, the second cable comprising a mechanism manufactured as part of the second cable and powered by the second electronic device and operable to cause the indicator to identity the characteristic of the first cable when the mechanism is engaged.

13. The cable system of claim 12 wherein the indicator is located on the end of the first cable that is for connecting to the first electronic device, and wherein the characteristic is the location of said end of the first cable.

14. The cable system of claim 12 wherein the indicator is an LED and wherein the mechanism is a pushbutton.

15. The cable system of claim 12 wherein the second cable further comprises a signal generator responsive to the pushbutton for generating a signal for causing the LED on the first cable to illuminate.

16. Apparatus for interconnecting electronic devices comprising:

a first electronic device;

a second electronic device;

a cable for transferring power and information between the first electronic device and the second electronic device;

an indicator on the first electronic device for identifying a characteristic associated with one end of the cable;

a mechanism, generating a signal using power provided by the first electronic device and operable to cause the indicator to indicate the characteristic associated with the one end of the cable;

wherein the mechanism causes the indicator to indicate the characteristic by causing the signal to be transferred to the indicator via the cable when the mechanism is engaged.

17. The apparatus of claim 16 wherein the mechanism comprises a pushbutton located on the second electronic device.

18. The apparatus of claim 17 wherein the indicator is a LED.

19. The apparatus of claim 17 wherein the indicator is located on the first electronic device and wherein the apparatus further comprises a signal generator in the second electronic device, the signal generator being responsive to the mechanism to produce the signal.

20. The apparatus of claim 19 wherein the mechanism is a circuit located in the second electronic device, the circuit being responsive to user commands to cause the signal generator to produce the signal.

* * * * *